United States Patent
Steck et al.

(10) Patent No.: US 9,236,731 B2
(45) Date of Patent: Jan. 12, 2016

(54) METHOD FOR LIMITING A SWITCH-ON CURRENT IN AN ELECTRICAL SYSTEM

(75) Inventors: Armin Steck, Kusterdingen (DE); Ralf Piscol, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 13/813,946

(22) PCT Filed: Jun. 7, 2011

(86) PCT No.: PCT/EP2011/059381
§ 371 (c)(1),
(2), (4) Date: Apr. 15, 2013

(87) PCT Pub. No.: WO2012/016738
PCT Pub. Date: Feb. 9, 2012

(65) Prior Publication Data
US 2013/0214705 A1    Aug. 22, 2013

(30) Foreign Application Priority Data
Aug. 4, 2010  (DE) .......................... 10 2010 038 892

(51) Int. Cl.
*G05B 5/00* (2006.01)
*H02H 9/02* (2006.01)
*B60L 3/00* (2006.01)
(Continued)

(52) U.S. Cl.
CPC *H02H 9/026* (2013.01); *B60L 3/00* (2013.01); *B60L 11/18* (2013.01); *G01K 7/00* (2013.01); *H02J 7/0063* (2013.01); *B60L 2240/36* (2013.01); *B60L 2250/10* (2013.01); *B60L 2270/20* (2013.01)

(58) Field of Classification Search
CPC . Y02T 10/7005; Y02T 10/7077; B60W 10/08
USPC .................................................. 318/139, 471
See application file for complete search history.

(56) References Cited

U.S. PATENT DOCUMENTS 6,304,061 B1 * 10/2001 Toya ............................. 320/134
7,688,023 B2 * 3/2010 Yoon et al. .................... 320/104
(Continued)

FOREIGN PATENT DOCUMENTS

| CN | 2685180 Y | 3/2005 |
|---|---|---|
| CN | 101106283 A | 1/2008 |

(Continued)

OTHER PUBLICATIONS

International Search Report corresponding to PCT Application No. PCT/EP2011/059381, mailed May 9, 2012 (German and English language document) (7 pages).

*Primary Examiner* — Rina Duda
(74) *Attorney, Agent, or Firm* — Maginot, Moore & Beck LLP

(57) ABSTRACT

The disclosure describes a method for limiting a switch-on current in an electrical system which is supplied with power by a battery. During a switch-on process, an electrical load is connected to the electrical system and precharged by means of a precharging resistor. A monitoring unit regularly records operating data of at least one variable which influences a temperature of the precharging resistor and estimates the temperature of the precharging resistor on the basis of said operating data. The disclosure also describes an apparatus and a battery which are designed to execute the method according to the disclosure.

9 Claims, 2 Drawing Sheets

(51) Int. Cl.
*B60L 11/18* (2006.01)
*G01K 7/00* (2006.01)
*H02J 7/00* (2006.01)

(56) References Cited

U.S. PATENT DOCUMENTS

| | | | |
|---|---|---|---|
| 8,766,602 B1* | 7/2014 | Kimes | 320/137 |
| 2008/0068116 A1* | 3/2008 | Marukawa et al. | 335/202 |
| 2008/0092258 A1* | 4/2008 | Clarke et al. | 903/907 |
| 2009/0230766 A1* | 9/2009 | Miyama et al. | 307/10.7 |
| 2011/0089905 A1* | 4/2011 | Yano | 320/132 |

FOREIGN PATENT DOCUMENTS

| | | |
|---|---|---|
| JP | 2008-211900 A | 9/2008 |
| JP | 2009-038925 A | 2/2009 |
| JP | 2009-229405 A | 10/2009 |
| WO | 2009/088156 A1 | 7/2009 |

\* cited by examiner

METHOD FOR LIMITING A SWITCH-ON CURRENT IN AN ELECTRICAL SYSTEM

This application is a 35 U.S.C. §371 National Stage Application of PCT/EP2011/059381, filed on Jun. 7, 2011, which claims the benefit of priority to Serial No. DE 10 2010 038 892.0, filed on Aug. 4, 2010 in Germany, the disclosures of which are incorporated herein by reference in their entirety.

The present disclosure relates to a method for limiting a switch-on current in an electrical system, in particular a high-voltage network, and a device and a battery which are designed to carry out the method according to the disclosure.

BACKGROUND

Methods for limiting a switch-on current in an electrical system, in particular a high-voltage network, with which pre-charging is undertaken via a pre-charging resistor during a switch-on operation so that a switch-on current which flows through a battery and a connected load is reduced, are known from the prior art. In such a system, the pre-charging resistor is short-circuited and therefore deactivated when the system voltage has adapted itself to the battery voltage. However, if such pre-charging takes place several times within a very short time, the pre-charging resistor can overheat.

Such overheating of the pre-charging resistor should particularly be avoided in battery systems on which very high demands with regard to reliability are placed, for example in systems such as those used in hybrid and electric vehicles. The background for the high demands is that, in such systems, a failure of the battery can lead to a failure of the whole system. For example, in an electric vehicle, a failure of the traction battery leads to a so-called "stranded vehicle". Likewise, a failure of the battery can lead to a safety-related problem, for example if the battery can no longer be isolated from the on-board vehicle network.

SUMMARY

The method according to the disclosure for limiting a switch-on current in an electrical system, in particular a high-voltage network which is supplied by a battery, basically comprises the following steps: during a switch-on operation, an electrical load is connected to the electrical system and pre-charged via a pre-charging resistor. A monitoring unit regularly records operating data of at least one variable which influences the temperature of the pre-charging resistor and, based thereon, estimates the temperature of the pre-charging resistor. By introducing suitable measures, this enables overheating of the pre-charging resistor to be prevented, which represents a gain in safety and reliability. The use of a temperature sensor for measuring the temperature of the pre-charging resistor can be dispensed with. At the same time, the monitoring can basically be carried out both in the battery system and outside the battery system.

In particular, the monitoring unit can record the following variables individually or in combination: a current flowing through the pre-charging resistor; a voltage applied to the battery; a number of switch-on operations per unit time; a duration of a switch-on operation and/or an ambient temperature. The monitoring of the temperature of the pre-charging resistor is therefore instituted in the form of an observer system, which continuously records individual, a plurality or all of the stated variables.

The temperature of the pre-charging resistor can be estimated based on a temperature model which predicts an inherent heating of the pre-charging resistor as a function of the recorded operating data. With every switch-on operation of the battery system, that is to say with every switching-on of an electrical load, the pre-charging resistor of the battery system is heated due to the high switch-on current. If a plurality of switch-on operations is now carried out within a short time, the temperature model can calculate the inherent heating of the pre-charging resistor.

If overheating of the pre-charging resistor is threatened, suitable countermeasures can be introduced:

A warning signal can be generated when the estimated temperature of the pre-charging resistor exceeds a pre-defined first temperature threshold value.

If the estimated temperature of the pre-charging resistor exceeds a pre-defined second temperature threshold value which is higher than the first temperature threshold value, then a (renewed) pre-charging of the electrical load via the pre-charging resistor can be prevented. Renewed pre-charging can be permitted once more when the estimated temperature of the pre-charging resistor falls below a pre-defined third temperature threshold value.

A further aspect of the disclosure relates to a device for limiting a switch-on current in an electrical system, in particular a high-voltage network, which is designed to carry out the method according to the disclosure. The device includes a battery and a pre-charging resistor, via which an electrical load can be pre-charged. The device also includes a monitoring unit for regularly recording operating data which allow the temperature of the pre-charging resistor to be estimated.

The monitoring unit can be part of the battery, but can also be arranged outside the battery. In the latter case, the monitoring unit can be part of a control device which is typically connected together with the battery to a field bus, in particular to a CAN (Controller Area Network) field bus.

In the case where the monitoring unit is part of the battery, the entire device according to the disclosure can be integrated in a battery. The battery is preferably a lithium-ion battery.

In both arrangements, a first relay can be connected in series with the series resistor and/or a second relay in parallel with the pre-charging resistor. As the device or battery according to the disclosure is designed to estimate the temperature of the pre-charging resistor and to introduce suitable countermeasures if the pre-charging resistor overheats, damage to the first relay can also be prevented.

The device or battery according to the disclosure can be part of a motor vehicle, in particular an electric motor vehicle.

BRIEF DESCRIPTION OF THE DRAWINGS

Exemplary embodiments of the disclosure are explained in more detail with reference to the drawings and the following description. In the drawings.

DETAILED DESCRIPTION

Figure 1:
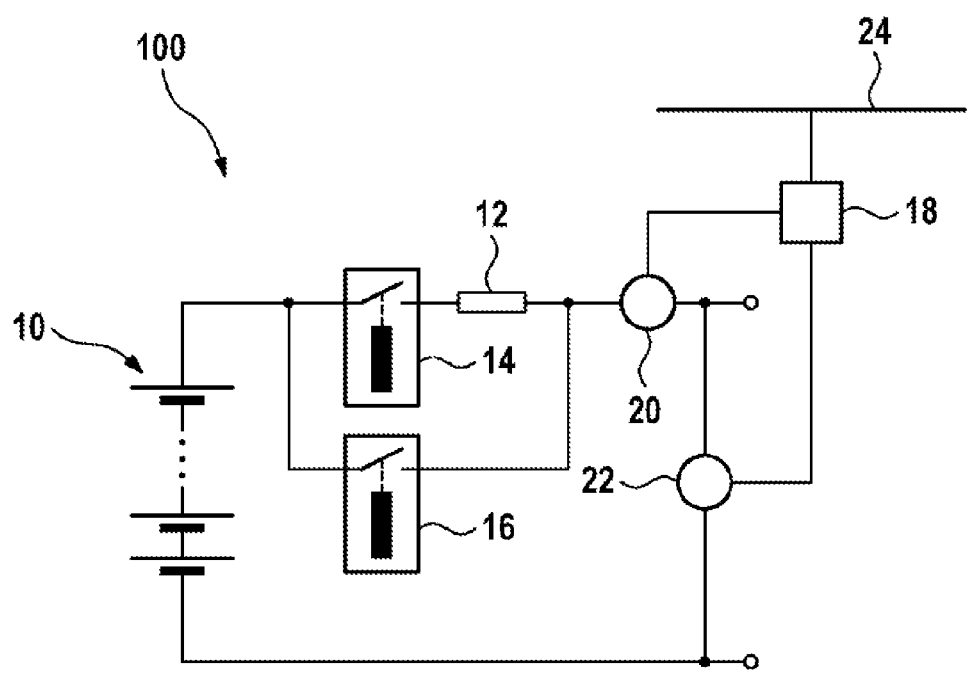
FIG. 1 shows an exemplary embodiment of a battery according to the disclosure.

FIG. 1 shows an exemplary embodiment of a battery according to the disclosure, designated as a whole by 100. The battery 100 comprises a multiplicity of battery cells 10 connected in series and a pre-charging resistor 12. If the pre-charging resistor 12 were not provided in the battery 100, a high switch-on current would flow through the battery when an electrical load (not shown) is connected, which can be attributed to the fact that the electrical load, which has a capacitive component, is being charged. In order to limit the switch-on current, the pre-charging resistor 12 is connected upstream of the electrical load by closing a first relay 14. When the switch-on current has decayed or the voltage on the electrical load has matched itself to the battery voltage, the first relay 14 is opened and the second relay 16 closed, as a result of which the pre-charging resistor 12 is short-circuited.

Pre-charging via the pre-charging resistor 12 prevents damage to the second relay 16 but results in heating of the pre-charging resistor 12. In order once again to prevent damage to the pre-charging resistor 12 without having to directly measure the temperature of the pre-charging resistor 12, a monitoring unit 18, which regularly records measurement data of a current measuring unit 20 and a voltage measuring unit 22, is provided in the battery 100. The monitoring unit 18 has the function of an observer system which calculates the temperature of the pre-charging resistor 12 using a temperature model based on the recorded measurement data.

If the temperature calculated in this way exceeds a predefined threshold value, this is notified to other control devices (not shown) via a data connection 24, such as a CAN-Bus for example, which is not part of the battery 100. Thereupon, suitable countermeasures, such as for example the generation of a warning signal or the blocking of a connection of further electrical components, can be taken.

In FIG. 1, the monitoring unit 18 is provided as part of the battery 100, in particular of a battery management unit. However, the monitoring unit 18 can also be arranged outside the battery 100 and preferably be included in a control device, for example a main control device of a motor vehicle.

Figure 2:
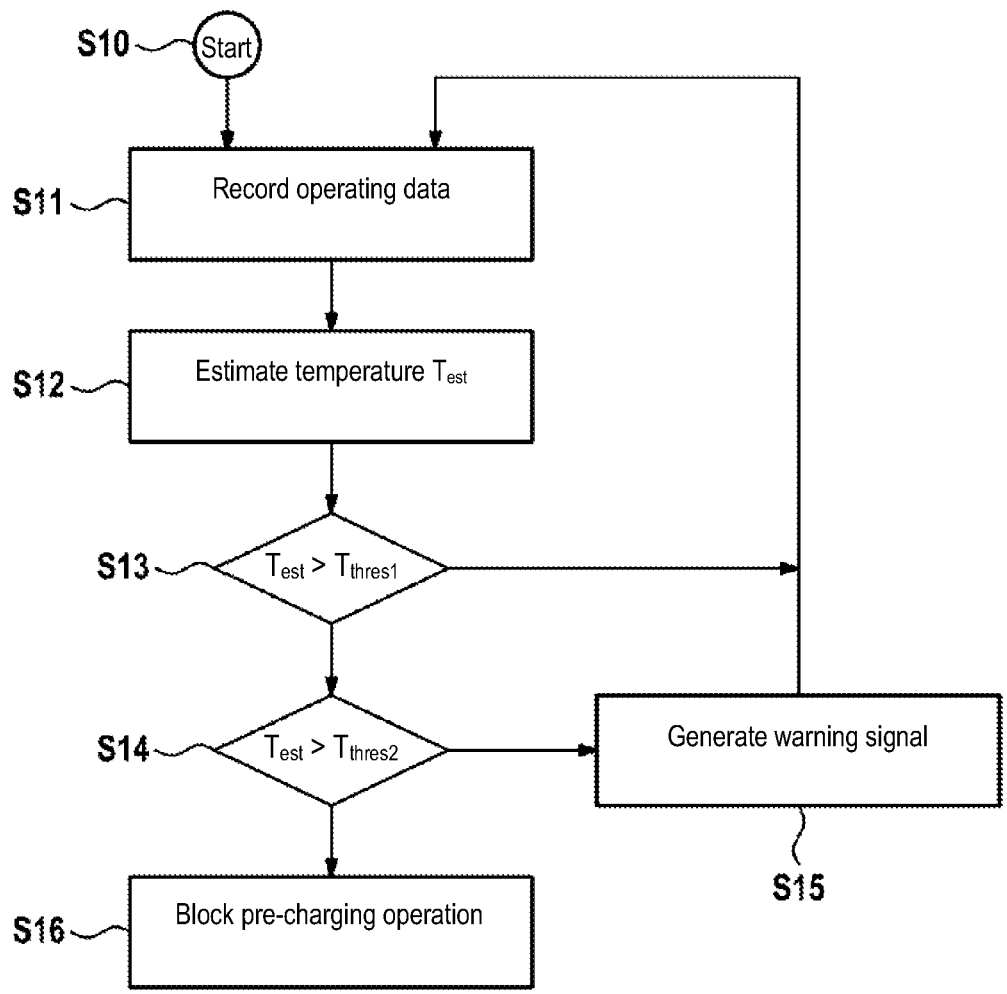
FIG. 2 shows an exemplary embodiment of a method according to the disclosure for limiting a switch-on current in an electrical system.

FIG. 2 shows an exemplary embodiment of a method according to the disclosure for limiting a switch-on current in an electrical system which is implemented in the battery shown in FIG. 1. The method starts in step S10. In S11, operating data, such as for example a current flowing through the pre-charging resistor 12 or a number of switch-on operations per unit time, are regularly recorded by the monitoring unit 18. In step S12, a temperature of the pre-charging resistor 12 is estimated based on the operating data. In step S13, the estimated temperature of the pre-charging resistor is compared with a predefined first temperature threshold value.

If the estimated temperature of the pre-charging resistor 12 is not greater than the pre-defined first temperature threshold value, the system branches back to the beginning of the method in step S11, otherwise the estimated temperature of the pre-charging resistor 12 is compared with a pre-defined second temperature threshold value in step S14. If the estimated temperature of the pre-charging resistor 12 is not greater than the pre-defined second temperature threshold value, only a warning signal is generated in step S15 and the system branches back to the beginning of the method in step S11. The warning signal can indicate to a vehicle driver, for example, that the vehicle or certain electrical components can no longer be started if further pre-charging operations take place. On the other hand, if the estimated temperature of the pre-charging resistor is greater than the pre-defined second temperature threshold value, a possible further pre-charging operation is blocked in step S16.

The invention claimed is:

1. A method for limiting a switch-on current of a circuit configured to receive current from a battery, the method comprising:
   connecting an electrical load to the battery during a switch-on operation;
   pre-charging the electrical load via a pre-charging resistor during the switch-on operation;
   regularly recording operating data including at least one variable that influences a temperature of the pre-charging resistor with a monitoring unit;
   estimating the temperature of the pre-charging resistor based on the recorded operating data;
   generating a warning signal in response to the estimated temperature of the pre-charging resistor exceeding a first temperature threshold value; and
   preventing pre-charging of the electrical load via the pre-charging resistor in response to the estimated temperature of the pre-charging resistor exceeding a second temperature threshold value that is greater than the first temperature threshold value.

2. The method as claimed in claim 1, the regularly recording further comprising:
   regularly recording at least one of a current flowing through the pre-charging resistor, a voltage applied to the battery, a number of switch-on operations per unit time, a duration of a switch-on operation, and an ambient temperature.

3. The method as claimed in claim 1, the estimating the temperature of the pre-charging resistor further comprising:
   estimating the temperature of the pre-charging resistor based on a temperature model that predicts an inherent heating of the pre-charging resistor as a function of the recorded operating data.

4. A device for limiting a switch-on current of a circuit configured to receive current from a battery, the device comprising:
   a connecting unit configured to connect an electrical load to the battery during a switch-on operation;
   a pre-charging unit configured to pre-charge the electrical load via a pre-charging resistor during the switch-on operation;
   a monitoring unit configured to regularly record operating data including at least one variable that influences a temperature of the pre-charging resistor;
   an estimating unit configured estimate the temperature of the pre-charging resistor based on the recorded operating data; and
   a protection unit configured to (i) generate a warning signal in response to the estimated temperature of the pre-charging resistor exceeding a first temperature threshold value and (ii) prevent pre-charging of the electrical load via the pre-charging resistor in response to the estimated temperature of the pre-charging resistor exceeding a second temperature threshold value that is greater than the first temperature threshold value.

5. The device as claimed in claim 4, further comprising:
   a control device,
   wherein the control device includes the monitoring unit.

6. The device as claimed in claim 5, wherein the control device and the battery are connected to a CAN field bus.

7. The device as claimed in claim 4, wherein a first relay is connected in series with the pre-charging resistor and a second relay is connected in parallel to the first relay with the pre-charging resistor.

8. A battery comprising:
   a pre-charging resistor configured to pre-charge an electrical load; and
   a monitoring unit configured to:
   regularly record operating data including at least one variable that influences a temperature of the pre-charging resistor;
   estimate the temperature of the pre-charging resistor based on the recorded operating data; and generate a warning signal in response to the estimated temperature of the pre-charging resistor exceeding a first temperature threshold value; and prevent pre-charging of the electrical load via the pre-charging resistor in response to the estimated temperature of the pre-charging resistor exceeding a second temperature threshold value that is greater than the first temperature threshold value.

9. The battery as claimed in claim 8, wherein the battery is configured (i) to connect an electrical load to the electrical network during a switch-on operation, and (ii) to pre-charge the electrical load via the pre-charging resistor during the switch-on operation.

* * * * *